Oct. 23, 1945.  E. A. DAVIS  2,387,650
APPARATUS FOR CUTTING STRIP MATERIAL
Filed Nov. 24, 1942   2 Sheets-Sheet 1
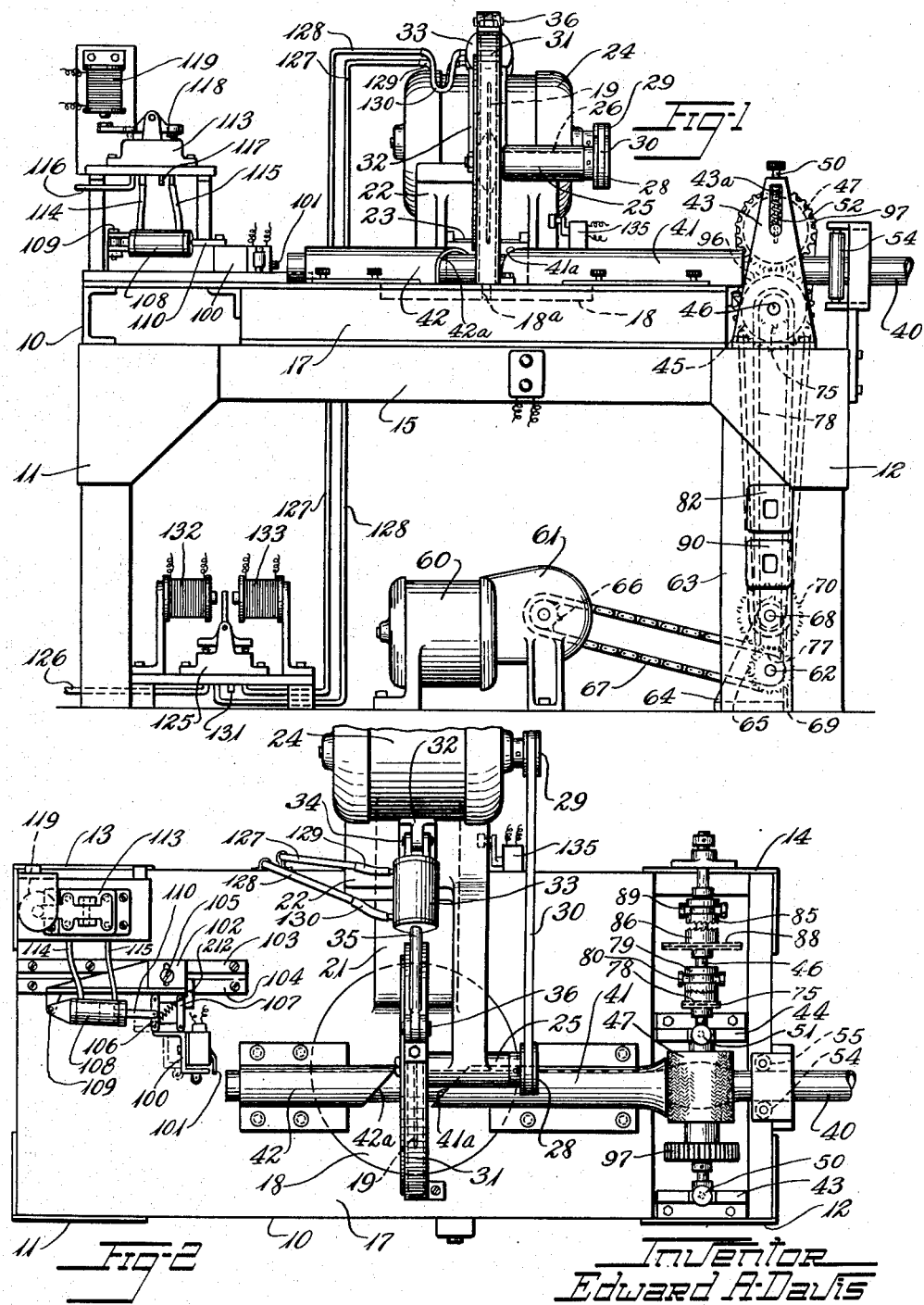
Inventor
Edward A. Davis
By Willis F. Avery
Atty.

Oct. 23, 1945. E. A. DAVIS 2,387,650
APPARATUS FOR CUTTING STRIP MATERIAL
Filed Nov. 24, 1942 2 Sheets-Sheet 2
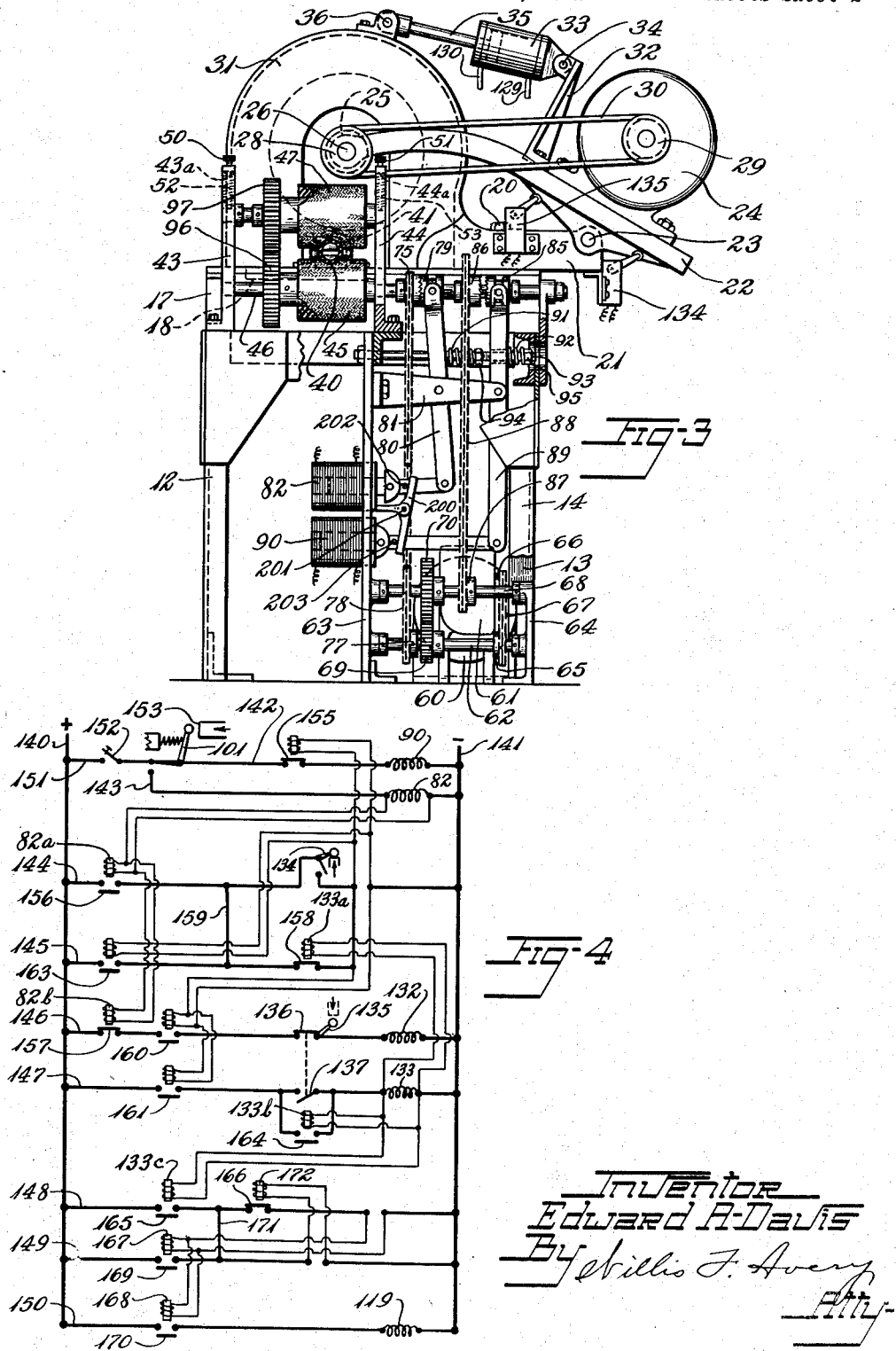

Patented Oct. 23, 1945

2,387,650

UNITED STATES PATENT OFFICE 2,387,650

APPARATUS FOR CUTTING STRIP MATERIAL

Edward A. Davis, Akron, Ohio, assignor to The B. F. Goodrich Company, New York, N. Y., a corporation of New York Application November 24, 1942, Serial No. 466,779

10 Claims. (Cl. 164—61)

This invention relates to the cutting of strip material into determinate lengths and is especially useful in cutting readily distortable strip material such as rubber hose and tubing.

Heretofore great difficulty has been experienced in cutting readily distortable strip material such as rubber hose or tubing accurately to length due to the fact that when fed past a cutter against a stop the hose or tubing has been distorted by compression. When cut in distorted condition the resulting ends have not been straight due to recovery of the material, and lengths have not been accurate due to unequal longitudinal compression.

The present invention aims to overcome the foregoing and other difficulties and to provide improved apparatus and procedure.

The principal objects of the invention are to provide uniformity in length of the cut pieces, to provide accurately squared ends, to avoid distortion during the cutting operation, to provide for cutting at various angles, and to combine accuracy with speed and facility of operation.

These and other objects will appear from the following description and the accompanying drawings.

Of the drawings:

Fig. 1 is a front elevation of apparatus constructed in accordance with and embodying the invention.

Fig. 2 is a plan view thereof, parts being broken away.

Fig. 3 is an end elevation thereof, partly in section and partly broken away.

Fig. 4 is a schematic wiring diagram.

The invention provides for advancing the strip material against a stop, then discontinuing the advance and initiating a retracting movement to relieve the pressure of the material against the stop. The retracting material is stopped approximately in contact with the stop so that it is relieved of strain and its position is determinate, whereupon the material is cut to length and its advance may be resumed.

In the illustrated form of apparatus of the invention a length of strip material is advanced along a guideway, as by feeding rolls, into contact with an electrical contact means as a stop thereby breaking a contact controlling the forward feed of the strip and closing a reversing circuit resulting in reversal of rotation of the feed rolls. As the strip moving back from the stop again changes the electrical contacts, the control circuits are both opened stopping return of the strip and the strip, free from distortion, is severed. The strip is then again advanced and the stop is automatically moved out of the path of the cut piece.

Referring to the drawings, the working parts of the apparatus are mounted on a frame 10 having legs 11, 12, 13, 14, and a rectangular upper frame member 15. A bed plate 17 is mounted on the top of the upper frame member 15 and supports a rotatable table 18 having a diametrical clearance slot 18a for clearing a rotatable cutter disc 19. The table 18 is adapted to be clamped to the plate 17 in a range of rotative positions by a clamp screw 20. An arm 21 extends radially from table 18 and has a hinge bearing at its outer end to which a swing frame 22 is pivotally secured by a hinge pin 23. Swing frame 22 has an electric motor 24 mounted on one end thereof, and is formed with a horizontal bearing 25 at its opposite end. A spindle 26 is journaled in bearing 25 and has a circular knife 19 fixed to it at one end, and a V-grooved pulley 28 fixed at its other end. Motor 24 has a V-grooved pulley 29 in line with pulley 28 and drives the circular knife through a V-belt 30.

A guard 31 encloses circular knife 19 and is fixed to table 18. An arm 32 is fixed to swing frame 22. A double-acting fluid-pressure-operated cylinder 33 is pivotally secured as by a pin 34 to arm 32. Its piston rod 35 is pivotally secured to guard 31, as by a pin 36. The arrangement is such that circular knife 19 can be moved toward and away from table 18 by cylinder 33 in any position of adjustment of the table 18 and while the knife is being driven by motor 24.

For guiding strip material, such as the hose 40, past the cutting position, tunnel guides 41, 42 are adjustably secured to plate 17 at opposite sides of the knife. Guides 41, 42 have their ends adjacent the knife mitered, as at 41a, 42a respectively, to permit cutting at angles up to 45 degrees.

For feeding the strip to the knife, a pair of pedestal brackets 43, 44 are fixed to frame member 15. A feed roller 45 fixed to a shaft 46 is journaled in the brackets. A second feed roller 47 is confined in vertical slots 43a, 44a of the brackets. These rollers have bodies of sponge rubber and coverings of stockinet fabric. Roller 47 is pressed against roller 45 by tension screws 50, 51 threaded through the brackets, and coil springs 52, 53 which are pressed against roller 47 by said screws 50 and 51. The soft sponge rubber permits the rollers to conform to strips of material without flattening the material excessively. Freely running guide rollers 54, 55 are provided ahead of the rollers 45, 47 to guide the strip thereto.

For driving the feed rollers in either direction, an electric motor 60 is mounted below frame 10 and has a speed reducer 61 fixed thereto. A countershaft 62 is horizontally mounted for rotation in bearings formed in vertically disposed frame members 63, 64 fixed to frame 10. Shaft 62 has a sprocket 65 fixed thereto, in line with a sprocket 66 on the speed reducer, from which it is driven by a chain 67. A second countershaft 68 is journaled in frame members 63, 64 above shaft 62 and is driven at a slower speed in the opposite direction by speed reducing spur gears 69, 70 fixed respectively to shafts 62 and 68 and meshing with each other. A sprocket 75 is rotatably mounted about shaft 46, and a sprocket 77 is fixed to shaft 62 in line therewith and drives sprocket 75 through a chain 78. A clutch member 79 is slidably mounted on a feather keyed portion of shaft 46 and has clutch teeth for engaging similar cooperating clutch teeth on sprocket 75. A shifter lever 80 is pivoted on an arm 81 fixed to frame member 63. One end of the lever engages the clutch member 79 and the other end is pivotally secured to the armature of a pull-type solenoid 82. The arrangement is such that when solenoid 82 is energized, the clutch member 79 disengages the sprocket 75 which drives shaft 46 in one direction.

A second clutch member 85 is slidably mounted on another feather-keyed portion of shaft 46 and has clutch teeth for engaging similar teeth on a sprocket 86 rotatably mounted on the shaft. Sprocket 86 is driven by a chain 88 from a sprocket 87 in line therewith fixed to shaft 68. A shifter lever 89 is pivoted on arm 81 and one end of it engages clutch member 85 while the other end engages the armature of a pull-type solenoid 90. When solenoid 90 is energized it disengages the clutch member 85 from sprocket 86. Coil springs 91, 92 are loosely mounted about a rod 93 fixed to frame member 63. Spring 91 presses shifter lever 80 in a direction to engage clutch member 79 with sprocket 75 and spring 92 presses lever 89 in a direction to engage clutch member 85 with sprocket 86. Nuts 94, 95 threaded on rod 93 are positioned to adjust the tension of springs 91, 92 respectively. A lever 200 is pivotally mounted as at 201 to frame member 63. One end of the lever engages a pin 202 carried by the armature of solenoid 82, and the other end engages a pin 203 carried by the armature of solenoid 90. The arrangement is such that the clutches 79, 85 are blocked against engaging at the same time. Roller 47 is driven from shaft 46 by spur gears 97, 96 fixed to roller 47 and shaft 46 respectively. The arrangement is such that when sprocket 75 is clutched, rolls 45, 47 feed the strip forward at high speed and when sprocket 86 is clutched rolls 45, 47 are reversed and feed the strip back at slower speed.

For regulating the length of cut a stop 100 is located in the path of travel of the strip. In order to prevent inaccuracy and to avoid cutting while the strip is under distortion or moving, an electric circuit controller in the form of a Micro Switch 101 mounted on the stop 100 is employed to control the movements of the strip through operation of solenoids 82, 90. The arrangement is such that, with solenoid 90 energized and solenoid 82 de-energized and the rolls 45, 47, feeding the strip toward the left in Figs. 1 and 2 or toward the stop, the leading end of the strip contacts the switch 101. This opens the circuit to solenoid 90 and simultaneously closes the circuit to solenoid 82 reversing the rolls 45, 47 at slow speed. Such reversal retracts the advanced end of the strip freeing it of distortion. As the end releases the Micro Switch, the circuit to solenoid 82 is again opened and that of solenoid 90 is again closed, but no reversal of the rolls takes place as the circuit supplying current to solenoid 90 has been broken by a control circuit hereinafter described. The arrangement is such that the strip is stopped at the cutting position free from endwise compression or other distortion.

To provide for swinging the Micro Switch stop out of the way before the strip is again fed forward and thereby preventing reversal of the feed rolls by the cut piece, the stop 100 is mounted as follows: A carriage 102 is adjustably mounted on rails 103, 104 for sliding movement toward and away from the feed rolls. A clamp screw 105 locks it in any position. Stop 100 is supported from the carriage 102 by parallel motion links 106, 107. A double-acting pressure-fluid-operated cylinder 108 is pivotally secured to carriage 102, as at 109. Its piston rod 110 is pivotally connected to link 106. A fixed stop 212 is mounted on the carriage to engage the stop 100 at the most advanced position of the piston rod.

A solenoid-operated four-way fluid control valve 113 is mounted on plate 17 and is connected to opposite ends of cylinder 108 by flexible hose connections 114, 115. It is supplied with compressed air or other fluid from a supply line 116 and has an exhaust 117. The valve is normally held by a spring 118 in a position to supply compressed air from pipe 116 to the left end of cylinder 108, as seen in Fig. 1, and to connect the right end of the cylinder to exhaust 117, but may be reversed by a solenoid 119. The arrangement is such that when solenoid 119 is energized, the stop 100 is swung to the left out of the path of the oncoming strip, and when it is de-energized, the stop is returned and held firmly in its measuring position by the fluid pressure.

For raising and lowering the cutter, a four-way solenoid-operated valve 125 is mounted below the frame 10 of the machine and is connected to a source of fluid pressure (not shown) by a pipe 126. Pipes 127, 128 lead from the valve delivery ports to flexible tubes 129, 130 respectively, whereby the valve is connected to the opposite ends of cylinder 33. Valve 125 has an exhaust 131. Solenoids 132, 133 on the valve are adapted, when alternately energized, to supply fluid under pressure alternately to opposite ends of the cylinder 33. The arrangement is such that when solenoid 132 is energized, fluid flows from line 126 through pipe 127 and tube 129 to the closed end of cylinder 33 and the opposite end of the cylinder is opened through tube 130, pipe 128 and valve 125 to the exhaust 131, and the cutter is moved downwardly toward the table, and when solenoid 132 is de-energized and solenoid 133 energized, fluid from line 126 flows through valve 125 to the rod end of cylinder 33 by way of pipe 128 and tube 130, and the closed end of the cylinder exhausts through tube 129, and pipe 127, and the cutter is raised to its upper position. A limit switch 134 on arm 21 and electrically in the control circuit of the apparatus is fixed to the frame of the machine in position to be held open by the cutter arm when the cutter is at its upper position (see Fig. 3) and is adapted to close a control circuit when the cutter is lowered. Another limit switch 135 is fixed to arm 21 and the frame of the machine in the path of the cutter arm and is of the two pole type having one pole 136 (see Fig. 4) closing the circuit through solenoid 132 and a second pole 137 opening the circuit through solenoid 133 when the cutter is up, and with the pole 136 opening the circuit through solenoid 132 and the pole 137 closing the circuit through solenoid 133 when the cutter arm contacts the limit switch at the lowered position of the cutter.

For controlling the operations of the mechanism, referring to Fig. 4, the main lines 140, 141 are continuously supplied with electric current and are adapted to supply the following circuits; a forward feeding line 142, a reverse feeding line 143, control setting lines 144, 145, a cutter down-feeding line 146, a cutter up-feeding line 147, control lines 148, 149, and a stop swinging line 150. Lines 142, 143 are adapted to be alternately energized through Micro Switch 101 supplied by a line 151 through a hand-operated switch 152. The Micro Switch normally closes circuit 142 and opens circuit 143, and when depressed by contact with the end 153 of a strip of material advanced by the feed rolls, opens circuit 142 and closes circuit 143 simultaneously. As shown in the drawings, all the circuits are de-energized.

In the operation of the machine, switch 152 is first closed, the motors 24 and 60 being in operation and controlled by circuits not shown. This energizes solenoid 90, disengaging clutch member 85, and as clutch member 79 is engaged, the rolls 45, 47 feed the strip toward the Micro Switch stop, a normally closed solenoid operated switch 155 in line 142 being closed.

As the advancing end 153 of the strip contacts the Micro Switch 101 it opens line 142, de-energizing solenoid 90 and closes line 143 energizing solenoid 82 and reversing the feed rolls to cause the end 153 of the strip to recede at slow speed. At the same time solenoids 82a, 82b, in parallel with solenoid 82 close a normally-open solenoid-operated switch 156 in line 144 and open a normally closed solenoid-operated switch 157 in line 146 respectively. The closing of switch 156 energizes line 144, as although limit switch 134 is held open by the cutter arm, a shunt circuit about the limit switch by way of a normally-closed solenoid switch 158 is provided through line 159. The energizing of this line 144 opens solenoid switch 155 in line 142 preventing further forward feed of the strip, and the strip stops. Line 144 is still energized and it also closes a normally open switch 160 in line 146 and a normally open switch 161 in line 147. But switch 137 holds line 147 open. In line 146, however, the de-energizing of solenoid 82a by opening of line 143 has closed switch 157 and pole 136 of switch 135 is closed, so the closing of switch 160 completes the circuit through solenoid 132 which causes the cutter to be lowered.

As the descending cutter arm strikes limit-switch 135 it opens switch pole 136 opening line 146 and de-energizing solenoid 132. Simultaneously switch pole 137 closes line 147, switch 161 being still held closed by line 145 which has a self-energized normally open switch 163 closed by the energizing of line 144. This energizes solenoid 133 and causes the cutter to be raised. At the same time solenoid 133a is energized and opens switch 158.

Now when the cutter arm opens limit switch 134, lines 144, 145 are de-energized, switch 155 drops to closed position, and switches 163, 160 and 161 drop open and are reset for the next cycle. When solenoid 133 was energized by closing switch poles 137, a solenoid 133b was also energized and closed a shunt switch 164 about pole 137, and when lines 144, 145 were de-energized, line 147 was opened by dropping a switch 161 opening switch 164. Furthermore, a solenoid 133c energized by line 147 closes a normally-open switch 165 in line 148 at the start of the cutter return and it stays closed until limit switch 134 is opened. A delayed-action time-relay switch 166, normally closed is in this line, as well as solenoids 167, 168 operating normally-open switches 169, 170 in lines 149 and 150 respectively. Energizing of line 148 closes switches 169, 170.

Line 150 includes solenoid 119 and this is energized by closing of switch 170 and swings the Micro Switch stop 100 out of the way of the cut piece of the strip as the rolls start the strip forward again. Switch 169 in closing sets up a holding circuit by way of line 171 and switch 166 through solenoids 167 and 168 after switch 165 has opened. Line 149 includes the solenoid 172 of the delayed time relay switch 166. After an interval for which the delayed time relay is set, and sufficient for the cut piece to be removed from the path of the stop 100, the switch 166 is automatically opened and lines 148, 149, and 150 and solenoid 119 are de-energized. The spring 118 reverses the valve 113 and cylinder 108 moves the stop 100 to its measuring position. When switch 152 remains closed, the cycle is repeated.

Variations may be made without departing from the scope of the invention as it is defined by the following claims.

I claim:

1. Apparatus for cutting flexible strip material to length comprising a stop, circuit control means at said stop, means for advancing the strip material into pressure contact with said stop, means arranged to be controlled by said circuit control means for retracting the material only sufficiently to bring it to a position in which the pressure of the material against the stop is substantially entirely relieved, and means for cutting the material to length while the material is in said position.

2. Apparatus for cutting strip material to length, said apparatus comprising means for feeding the strip in one direction, a stop in the path of the strip, and circuit control means constructed and arranged to be actuated by contact of the strip with the stop for retracting the strip to remove substantially entirely the strain of said contact therefrom.

3. Apparatus for cutting strip material to length, said apparatus comprising cutting means, means for feeding the strip material past said cutting means, a stop in the path of the strip, and circuit control means constructed and arranged to be actuated by contact of the strip with the stop for retracting the strip to remove substantially entirely the strain of said contact therefrom.

4. Apparatus for cutting strip material to length, said apparatus comprising cutting means, means for feeding the strip material past said cutting means, a stop in the path of the strip, means actuated by contact of the strip with said stop for stopping forward feed and for initiating a retractive feed of the strip, and means for stopping the strip in its retractive movement approximately in contact with the stop and substantially entirely free from strain.

5. Apparatus for cutting strip material to length, said apparatus comprising cutting means, electrically controlled means for feeding the strip material past said cutting means, a stop in the path of the strip, said stop having circuit control means associated therewith, means actuated by contact of the strip with said stop for reversing and stopping the feed of the strip, and electrical control means actuated by the reversing means for initiating movement of the cutting means.

6. Apparatus for cutting strip material to length, said apparatus comprising means for feeding a strip first in a forward direction past a cutting station and then in a reverse direction, a stop in the path of the strip, and means operable in response to contact of the strip with the stop to initiate the reverse travel of the strip and then to stop the strip at the position approximately of initial contact with said stop and substantially free from contact pressure against said stop.

7. Apparatus for cutting strip material to length, said apparatus comprising means for feeding a strip first in a forward direction past a cutting station and then in a reverse direction, a stop in the path of the strip, means operable in response to contact of the strip with the stop to initiate the reverse travel of the strip and then to stop the strip at the position approximately of initial contact, and means responsive to action of the stop for severing the strip while it is in said position.

8. Apparatus for cutting strip material to length, said apparatus comprising means for feeding a strip first in a forward direction past a cutting station and then in a reverse direction, a stop in the path of the strip, means operable in response to contact of the strip with the stop to initiate the reverse travel of the strip and then to stop the strip at the position approximately of initial contact, means at said station responsive to action of the stop for severing the strip, and means responsive to movement of the cutting means for temporarily removing the stop from the path of travel of the strip.

9. Apparatus for cutting strip material to length, said apparatus comprising means for feeding a strip, a cutter, means for moving the cutter across the path of the strip to sever the same and to return the cutter, a stop in the path of the strip, means operable in response to contact of the strip with the stop to stop the advance of the strip and initiate the cuting movement, and means responsive to movement of the cutting means for temporarily removing the stop from the path of travel of the strip.

10. Apparatus for cutting strip material to length, said apparatus comprising a pair of feed rolls for feeding the strip, means for driving the feed rolls in one direction, a stop in the path of the strip, means responsive to contact of the strip with the stop for driving the feed rolls in the opposite direction to reverse the travel of said strip, means for stopping the strip during its reverse movement, means for then cutting the strip while it is at rest, means responsive to action of said cutting means for again feeding the strip, and means responsive to action of said cutting means for moving the stop from the path of the strip during the succeeding forward movement of the strip.

EDWARD A. DAVIS.